July 13, 1971 D. R. MORROW 3,592,591
PRODUCTION OF NITRIC ACID
Original Filed Oct. 22, 1965
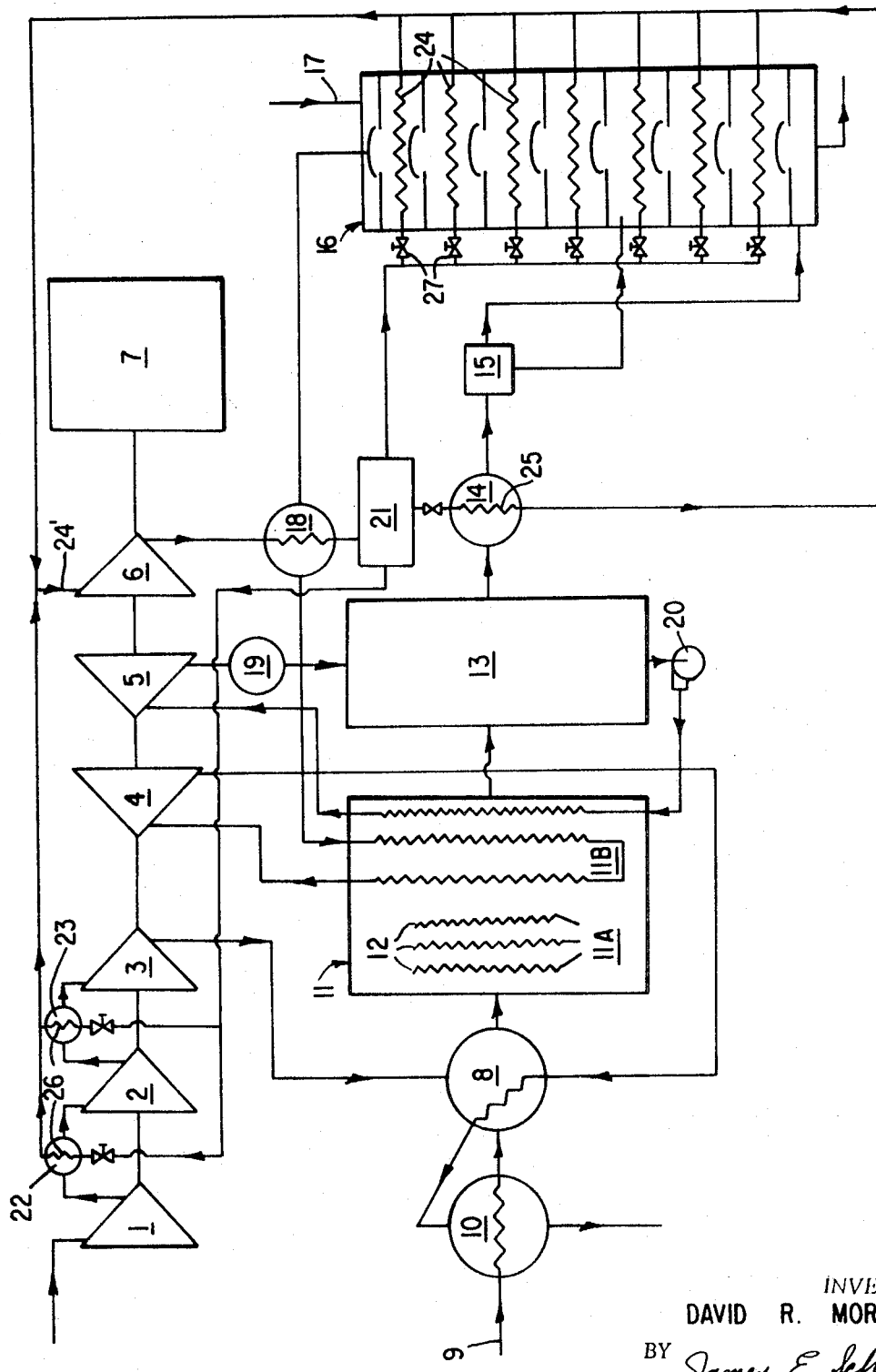
INVENTOR.
DAVID R. MORROW.
BY James E. Schardt
ATTORNEY.

United States Patent Office 3,592,591
Patented July 13, 1971

3,592,591
PRODUCTION OF NITRIC ACID
David R. Morrow, Irwin, Pa., assignor to Carrier Corporation, Syracuse, N.Y.
Original application Oct. 22, 1965, Ser. No. 500,912, now Patent No. 3,441,380. Divided and this application Oct. 29, 1968, Ser. No. 771,537
Int. Cl. C01b 21/40
U.S. Cl. 23—162
2 Claims

ABSTRACT OF THE DISCLOSURE

A nitric acid producing plant employing a refrigeration unit which utilizes energy given off by the chemical reactions productive of nitric acid to cool the substances produced by the chemical reactions and to reduce the temperature of the plant absorption tower to increase reaction efficiency and decrease reaction time to increase plant efficiency.

---

This is a division of application Ser. No. 500,912, filed Oct. 22, 1965, now U.S. Patent 3,441,380.

This invention relates to the manufacture of acid and more particularly to an improved method and apparatus for producing a gaseous oxide that can be absorbed in water to produce an acid.

In the manufacture of an acid such as nitric acid, ammonia is oxidized in the presence of a platinum catalyst to produce nitric oxide. The oxide is then absorbed in water to produce nitric acid. For maximum efficiency, the ammonia is vaporized and then mixed with high pressure air before oxidation. To supply this high pressure air, the heat of oxidation is utilized to heat motive fluid to power steam and/or gas turbines which drive air compressors.

In present plants, the energy obtained from the oxidation process is barely sufficient to drive the air compressors. Also in present plants, a large expensive absorption tower is necessary to produce acid by absorbing the oxide in water.

It is therefore an object of this invention to provide an improved plant for the production of acid which will efficiently utilize the energy given off by the process to completely power the plant.

It is a further object of this invention to provide a plant for the production of acid which will produce enough excess energy to drive a generator or other device for producing power or useful work.

It is a further object of this invention to provide a plant which is smaller, more compact, and which produces a greater amount of stronger acid than existing plants.

It is also an object of this invention to provide a plant with a smaller, more economical absorption tower for converting the gaseous oxide into an acid. Because of the presence of acid in the absorption tower, it must be constructed of expensive, acid resistant metals. Any decrease in the size of the tower obviously results in a savings due to decreased use of expensive metals.

It is another object of this invention to provide a refrigeration unit operable in conjunction with the nitric acid producing plant to cool the various substances used and the absorption tower to increase reaction efficiency, decrease reaction time and generally increase the efficiency of the whole plant by utilizing the energy represented by the heat absored in accomplishing the cooling action.

It is a further object of this invention to provide an improved method for the production of acid from a gaseous oxide which is absorbable in water to produce an acid.

The objects of this invention are obtained by providing air compression means, a refrigerant compressor and an electrical generator all driven by a steam turbine and a gas turbine.

The chemical to be oxidized to produce the acid is first vaporized and mixed with high pressure air from the compressors. The mixture is then oxidized in a chamber in the presence of a catalyst. The oxide produced is directed through an economizer, a cooler, a weak acid separator and into an absorption tower where it reacts with water to produce acid and tailgas, a waste product. The tailgas is routed from the absorption tower, through the oxidizing combustion chamber, where it is heated, and then to a gas turbine to provide motive power to drive the turbine. A steam turbine is also utilized to power this system. Water is pumped through the oxidizing combustion chamber where it is converted to steam to drive the steam turbine. It is thereafter condensed and sent through the economizer back to the water pump.

In order to achieve additional operating economy, it is proposed to improve the cycle described to include a refrigeration circuit for the purpose of absorbing the heat produced in the absorption tower and delivering it to parts of the cycle requiring heat.

To this end, a compressor, driven by the steam and hot gas turbines, is used to compress a refrigerant. The compressed refrigerant is then cooled by the tailgas obtained from the absorption tower, effectively preheating the tailgas before it is heated in the combustion chamber. The refrigerant is used to cool the oxide after it emerges from the economizer. The refrigerant is also used to cool the absorption tower to provide a more efficient absorption and a higher strength acid with a smaller, more economical tower. Finally, refrigerant is used to cool the compressed air between compression stages to reduce the amount of power necessary to drive the compression means.

The preferred embodiment of this invention is illustrated in the accompanying drawing which is a diagrammatic view of a nitric acid producing plant.

Referring to the drawing there is shown a low pressure compressor 1, an intermediate pressure compressor 2 and a high pressure compressor 3 driven by a gas turbine 4 and a steam turbine 5. Turbines 4 and 5 also drive refrigerant compressor 6 and electrical generator 7. High pressure air from the compressor 3 is routed to an ammonia and air mixer and preheater 8. Ammonia is supplied from supply line 9, through vaporizer 10 to the mixer-preheater 8. Heated, mixed air and ammonia vapor from the mixer 8 is supplied to a converter section 11A of chamber 11 having therein platinum catalysts 12. The mixture burns in the presence of a catalyst, producing NO and $NO_2$ which is delivered to an economizer 13, through a cooler 14 to a weak acid separator 15. From there, the gaseous oxide is routed to an absorption tower 16 and the weak acid from the separator 15 is delivered to the bottom portion of absorption tower 16 for subsequent passage through the acid output line of the absorption tower. Water, entering the absorption tower through line 17 combines with the oxide to produce $HNO_2$ which is drained out the bottom of the tower while a waste gas, $N_2$, is drawn out the top of the tower. The cold tailgas ($N_2$) is conducted through a refrigerant condenser tailgas preheater 18 and then through boiler section 11B of chamber 11 where it picks up sufficient heat to drive gas turbine 4. From the turbine, the tailgas is routed to the mixer-preheater 8 to heat up the air-ammonia mixture. From the mixer 8, the tailgas is routed to the vaporizer 10 to provide heat to vaporize the liquid ammonia. From the vaporizer 10, the tailgas is exhausted to the atmosphere.

Water, pumped into the boiler section of chamber 11 and converted into steam by the heat therein, is supplied to the steam turbine 5, condensed in condenser 19, used as a coolant in economizer 13 and delivered back to the pump 20.

The refrigeration system employed to increase the efficiency of the plant is comprised of compressor 6, condenser 18, liquid refrigerant storage tank 21, cooler 14, compressed air coolers 22 and 23, absorption tower coils 24, and suction conduit 24'.

Vaporized refrigerant is supplied to compressor 6 and compressed, being converted to the liquid phase in condenser 18. The compressed liquid refrigerant cooled in the refrigerant cooler-tailgas preheater 18 is routed to refrigerant liquid storage tank 21. The liquid is then directed to cooler evaporator coils 25, absorption tower evaporator coils 24 and cooler evaporator coils 26 in parallel, passing through expansion nozzles 27 en route. The refrigerant is vaporized as it absorbs heat in the absorption tower 16, the cooler condenser 14 and coolers 22 and 23. The heat in the absorption tower includes heat generated by the chemical process occurring therein as well as heat transferred as the vapor is cooled and converted to a liquid.

The coolers 22 and 23, by cooling the air between compression stages, reduce the amount of energy necessary to compress the air. By cooling the nitric oxide in cooler 14 and maintaining the absorption tower 16 at a low temperature, the efficiency of the tower is increased, allowing the use of a smaller, less expensive tower to produce an acid of high concentration.

By refrigerating the system, efficiency of the plant is increased to a point where there is sufficient excess energy given off by the process and recovered through utilization of the latent heat of vaporization and the latent heat of condensation of the refrigerant to drive a generator or other machine to provide power for other operations in the factory.

While I have described a preferred embodiment of my invention, it will be understood that the invention is not limited thereto but may be otherwise embodied within the scope of the following claims.

I claim:

1. The method of producing nitric acid which consists in the steps of evaporating liquid ammonia, mixing the vaporous $NH_3$ with air under pressure in the presence of a suitable catalyst to form nitrous oxide and water, utilizing the heat produced by the oxidation process to provide steam, passing the steam to a turbine mechanically coupled to air compression means and to refrigerant compression means disposed within a refrigeration circuit, passing the nitrous oxide to an absorption tower for absorption into water to form nitric acid and tailgas, employing low pressure refrigerant flowing in the refrigeration circuit to absorb the heat of absorption, passing the nitrogen gas formed in the absorber in heat transfer relation with refrigerant flowing from the refrigerant compressor to condense the high pressure refrigerant.

2. The method of producing nitric acid according to claim 1 wherein the air under pressure for mixing with $NH_3$ is produced by; compressing air in first compression means, passing the compressed air from the first compression means in heat exchange relation with refrigerant flowing through the refrigeration circuit to remove the heat of compression from the air; and, further compressing the air in second compression means.

References Cited

UNITED STATES PATENTS

| 1,735,342 | 11/1929 | Taylor et al. | 23—162 |
| 2,135,733 | 11/1938 | Richardson | 23—162 |
| 2,942,953 | 6/1960 | Shields | 23—162X |
| 2,955,917 | 10/1960 | Roberts et al. | 23—162 |

OSCAR R. VERTIZ, Primary Examiner

G. O. PETERS, Assistant Examiner

UNITED STATES PATENT OFFICE
CERTIFICATE OF CORRECTION

Patent No. 3,592,591              Dated July 13, 1971

Inventor(s) DAVID R. MORROW

It is certified that error appears in the above-identified patent and that said Letters Patent are hereby corrected as shown below:

Column 2, line 59, "$HNO_2$" should read --$HNO_3$--

Signed and sealed this 29th day of August 1972.

(SEAL)
Attest:

EDWARD M. FLETCHER, JR.
Attesting Officer

ROBERT GOTTSCHALK
Commissioner of Patents